(12) United States Patent
Daniel

(10) Patent No.: US 9,189,697 B1
(45) Date of Patent: Nov. 17, 2015

(54) SYSTEM AND METHOD FOR DETECTING RECORDING DEVICES

(76) Inventor: Isaac S. Daniel, Miramar, FL (US)

( * ) Notice: Subject to any disclaimer, the term of this patent is extended or adjusted under 35 U.S.C. 154(b) by 466 days.

(21) Appl. No.: 13/032,371

(22) Filed: Feb. 22, 2011

Related U.S. Application Data

(60) Provisional application No. 61/306,697, filed on Feb. 22, 2010.

(51) Int. Cl.
H04N 9/80 (2006.01)
G06K 9/20 (2006.01)
H04N 21/4627 (2011.01)

(52) U.S. Cl.
CPC .......... *G06K 9/2018* (2013.01); *H04N 21/4627* (2013.01)

(58) Field of Classification Search
USPC .................................. 386/252, 258; 348/151
See application file for complete search history.

(56) References Cited

U.S. PATENT DOCUMENTS

| 8,184,175 | B2 | 5/2012 | Mooradian et al. | |
| 2002/0059522 | A1 | 5/2002 | Hirano et al. | |
| 2003/0126121 | A1* | 7/2003 | Khan et al. | 707/3 |
| 2004/0061676 | A1* | 4/2004 | Sitrick et al. | 345/90 |
| 2007/0013778 | A1* | 1/2007 | Will et al. | 348/151 |
| 2007/0103552 | A1* | 5/2007 | Patel et al. | 348/203 |
| 2008/0075334 | A1* | 3/2008 | Determan et al. | 382/117 |
| 2008/0081552 | A1* | 4/2008 | Light et al. | 455/1 |
| 2010/0058485 | A1* | 3/2010 | Gonzalez | 726/27 |
| 2010/0205667 | A1* | 8/2010 | Anderson et al. | 726/19 |
| 2010/0309288 | A1* | 12/2010 | Stettner et al. | 348/43 |

* cited by examiner

Primary Examiner — Hung Dang
Assistant Examiner — Girumsew Wendmagegn
(74) Attorney, Agent, or Firm — Alberto Interian, III, Esq.

(57) ABSTRACT

A system comprising at least one processor; at least one sensor electronically connected to the at least one processor; and computer executable instructions readable by the at least one processor and operative to use the at least one sensor to detect a recording device. A method comprising: using at least one sensor to detect a recording device; and controlling a content played on a content playing device based on whether a recording device is detected. A computer readable medium having computer executable instructions for performing a method comprising: using at least one sensor to detect a recording device; and controlling content played on a content playing device based on whether a recording device is detected.

22 Claims, 4 Drawing Sheets

SYSTEM AND METHOD FOR DETECTING RECORDING DEVICES

PRIORITY CLAIM

This patent application is a continuation-in-part of U.S. Provisional Application No. 61/306,697, filed Feb. 22, 2010, entitled "System and Method for Detecting Recording Devices," by Isaac S. Daniel.

FIELD

The present disclosure relates generally to electronic systems, and more particularly, to systems, methods, and various other disclosures related to object detection, such as the detection of recording devices, such as, but not limited to, cameras, microphones, and the like.

BACKGROUND

Traditionally, a major problem for media production companies has been piracy, theft, and unauthorized viewing of media content. Most media content, such as movies, sports broadcasts, and the like, is covered by copyrights, and many people make a living by selling pirated copies of the media content.

In many cases, people have been known to sneak a camera into a movie theatre to copy a first run film, and then sell copies of that first run film on the black market. Thus far, the only way movie theatres and media content producers prevent piracy is by having security guards or movie theatre employees monitor movie theatre goers to make sure that no one is entering with or using a camera in the movie theatre. Nevertheless, film piracy due to unauthorized use of cameras is still a major problem for media production companies and movie theatres all over the world, and the problem is further exacerbated by the fact that there is no way to monitor whether users at home are making illegal copies of content using recording devices.

SUMMARY

The various systems, methods, and embodiments described herein result from the realization that media piracy can be prevented by providing a system that uses a sensor to detect a recording device.

Accordingly, the various embodiments and disclosures described herein solve the limitations of the prior art in a new and novel manner.

DETAILED DESCRIPTION OF PREFERRED EMBODIMENTS

System Level Overview

Figure 1A:
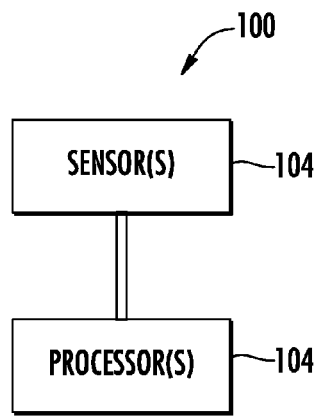
FIGS. 1A through 1D show a system in accordance with various embodiments.

FIGS. 1A through 1D show a system 100 in accordance with some embodiments. In one embodiment, as shown in FIG. 1A, system 100 comprises at least one processor 102, at least one sensor 104 electronically connected to at least one processor 102, and computer executable instructions (not shown) readable by at least one processor 102 and operative to use at least one sensor 104 to detect a recording device (shown with reference to numeral 108 in FIG. 1C).

The terms "electronically connected," "electronic connection," and the like, as used throughout the present disclosure, are intended to describe any kind of electronic connection or electronic communication, such as, but not limited to, a physically connected or wired electronic connection and/or a wireless electronic connection.

In some embodiments, the at least one processor 102 may be any kind of processor, including, but not limited to, a single core processor, a multi core processor, a video processor, and the like.

At least one sensor 104 may be any kind of sensor, including, but not limited to, a video sensor, such as a camera, a 3D camera, a motion sensor, an infrared sensor, and the like. In some embodiments, at least one sensor 104 may comprise a 3D sensor, such as a time of flight sensor or structured light sensor, which may include any of those various embodiments developed or produced by Optrima NV, Witherenstraat 4-1040 Brussels, Belgium; Prime Sense, 28 Habarzel St., 4$^{th}$ Floor, Tel-Aviv, 69710, Israel; PMDTechnologies GmbH, Am Eichenlag 50, D-57076 Siegen, Germany; and Microsoft, Corp., One Microsoft Way, Redmond, Wash., USA. At least one sensor 104 may include a light source, which may be used to illuminate any objects in sensor 104's field of sensing. In preferred embodiments, at least one sensor 104 may include a field of sensing 118 that is greater than or encompasses the field of perception of display device 114.

At least one sensor 104 may be positioned in the same enclosure as at least one processor 102. Alternatively, at least one sensor 104 may be positioned remotely to at least one processor 102, such as near a couch, near a screen, or another location, and may be in wireless or wired electronic communication with at least one processor 102.

Recording device 108 may be any kind of recording device, such as, but not limited to, an audio recording device, such as a microphone, or a video recording device, such as a camera, or a combination of both an audio and a video recording device.

Figure 1B:
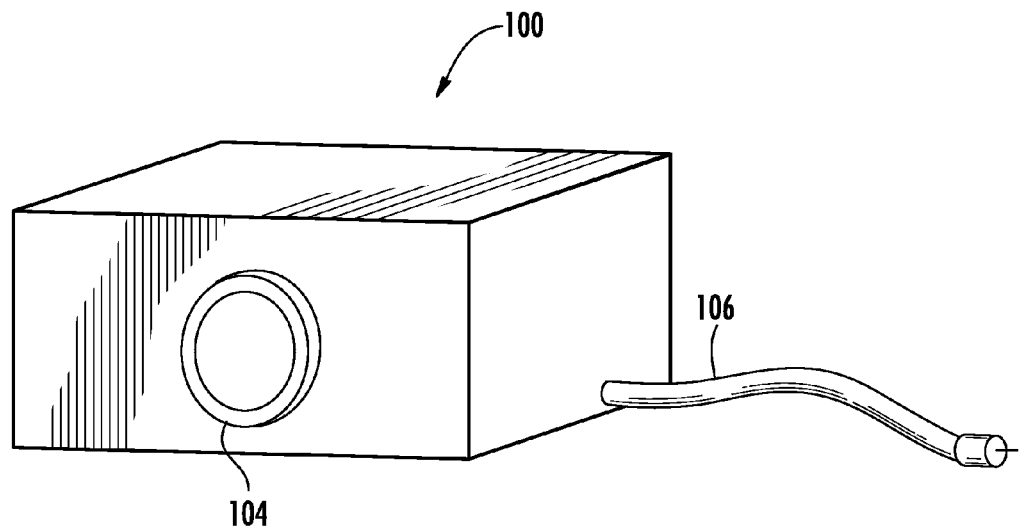

In some embodiments, system 100 further comprises at least one means 106 for electronically connecting a display device 114 to system 100, wherein the at least one means 106 for electronically connecting a display device 114 to the system may be any kind of means, such as a video connector, a coaxial cable, an HDMI cable, an s-video connector, a component connector, a Wi-Fi video transceiver, a BLUETOOTH video transceiver, an internal video cable socket, a DVI connector, and the like. In FIG. 1B, means 106 for electronically connecting a display device to the system is shown to include a cable, but it should be noted that means 106 may include, or may not include a cable. The display device 114 may be any kind of display device, such as, but not limited to, a television, a computer monitor, a projector, or any other kind of screen and/or display device.

The computer executable instructions may be loaded directly on the processor, or may be stored in a storage means, such as, but not limited to, computer readable media, such as, but not limited to, a hard drive, a solid state drive, a flash memory, random access memory, CD-ROM, CD-R, CD-RW, DVD-ROM, DVD-R, DVD-RW, and the like. The computer executable instructions may be any type of computer executable instructions, which may be in the form of a computer program, the program being composed in any suitable programming language or source code, such as C++, C, JAVA, JavaScript, HTML, XML, and other programming languages.

In one embodiment, the computer executable instructions may include object recognition software and/or firmware, which may be used to analyze data 118, such as an image or sound, captured by at least one sensor 104 and to determine, and consequently detect, whether recording device 108 is present. Detecting a recording device 108 may include using object recognition software to detect recording device 108, such as by using object recognition software to detect an object or a feature of an object similar to that of a recording device or included in a recording device, such as a lens. Accordingly, in some embodiments, detecting a recording device 108 may include using object recognition software to detect a small, flat, round, and/or convex surface, such as a lens. In another embodiment, detecting a recording device 108 may include capturing data 118, such as an image of recording device 108, captured by at least one sensor 104, and comparing it to data, such as images of recording devices, stored in a database.

The terms "object recognition software," "facial recognition software," and "image recognition software," as used throughout the present disclosure, may refer to the various embodiments of object recognition software known in the art, including, but not limited to, those embodiments described in the following publications: *Reliable Face Recognition Methods: System Design, Implementation, and Evaluation*, by Harry Wechsler, Copyright 2007, Published by Springer, ISBN-13: 978-0-387-22372-8; *Biometric Technologies and Verification Systems*, by John Vacca, Copyright 2007, Elsevier, Inc., Published by Butterworth-Heinemann, ISBN-13: 978-0-7506-7967-1; and *Image Analysis and Recognition*, edited by Aurelio Campilho and Mohamed Kamel, Copyright 2008, Published by Springer, ISBN-13: 978-3-540-69811-1, *Eye Tracking Methodology: Theory and Practice*, by Andrew T. Duchowski, Copyright 2007, Published by Springer, ISBN 978-1-84628-608-7, all of which are herein incorporated by reference. In one embodiment, the object recognition software may comprise 3D sensor middleware, which may include 3D gesture control and/or object recognition middleware, such as those various embodiments produced and developed by Softkinetic S. A., 24 Avenue L. Mommaerts, Brussels, B-1140, Belgium, Microsoft Corp., One Microsoft Way, Redmond, Wash., USA, and Omek Interactive, 2 Hahar Street, Industrial Zone Har Tuv A, Ganir Center Beith Shemesh 99067, Israel.

In one embodiment, the computer executable instructions may be operative to control content 116 being played on a content playing device, such as display device 114, in electronic communication with at least one processor 102, a DVD player, a set top box, a DVR, and the like. In a further embodiment, the computer executable instructions may be operative to control the content 116 played on the content playing device based on whether a recording device is detected. In some embodiments, controlling the content 116 played on the content playing device includes, but is not limited to, ceasing to play the content 116, pausing the content 116, playing the content 116, continuing to play the content 116, or scrambling the content 116. In some embodiments, for example, if at the outset of the content's 116 play, a recording device 108 is detected, the content 116 may not even begin playing. In further embodiments, if at the outset of the content's 116 play, a recording device 108 is not detected, but at a later time is detected, the computer executable instructions may scramble, pause, freeze, or cease playing the content 116 altogether. In a further embodiment, if a recording device 108 is detected at the outset of the content's 116 play, but then later is not detected, the computer executable instructions may begin or continue playing the content 116. The content 116 may be any kind of content, such as, but not limited to, a movie, a television show, a sports broadcast, such as a sports event, news, educational content, and the like.

In a further embodiment, system 100 comprises at least one means for communication with a local device, wherein the means for communicating with the local device may be electronically connected to the at least one processor 102. In some embodiments, such means may include a Bluetooth module, a USB port, an infrared port, a network adapter, such as a Wi-Fi card, and the like. The local device may be any kind of device, such as a television, a computer, a remote control, a telephone, a portable digital assistant, and the like.

In yet another embodiment, system 100 further comprises at least one means for communicating with a remote device, wherein the means for communicating may be electronically connected to the at least one processor 102. In some embodiments, the means for communicating with a remote device may be any kind of means, such as, but not limited to, a wireless modem, such as a GSM modem, a wired modem, an Ethernet adapter, a Wi-Fi adapter, and the like. In some embodiments, the remote device may be located at a media service provider, such as, but not limited to, a television service provider, a movie provider, a sports media provider, an internet provider, a television station, a server computer, and the like. The remote device may be any kind of remote device, including, but not limited, a server computer, a personal computer, a notebook computer, a cellular phone, and the like. In such embodiments, the computer executable instructions may be further operative to use the at least one means for communicating with a remote station to transmit or receive information to or from the remote station. The information may include media content, such as content 116, television shows, sports broadcasts, movies, and the like.

In a further embodiment, the computer executable instructions may be operative to trigger an alert if a recording device 108 is detected. In some embodiments, the alert may be a local alert, such as an audible or visual alert capable of being perceived by the persons in local proximity. In yet another embodiment, the alert may be a remote alert, such as an alert sent by system 100 to a remote device, user, or station, wherein the alert may be any kind of alert, including, but not limited to, an e-mail, and SMS message, a phone call, and the like. In some embodiments, if a recording device is detected, an alert may be sent to a remote station notifying authorities that someone may be trying to pirate content. In further embodiments, it may be the case that recording device 108 is being used to pirate content 116, in which case it may be desirous to alert the content broadcaster or content provider that a possible breach has occurred, in which case the content may be stopped, scrambled, or removed altogether from a playback device. In which case, the broadcaster could then inform authorities to investigate the situation.

Figure 1C:
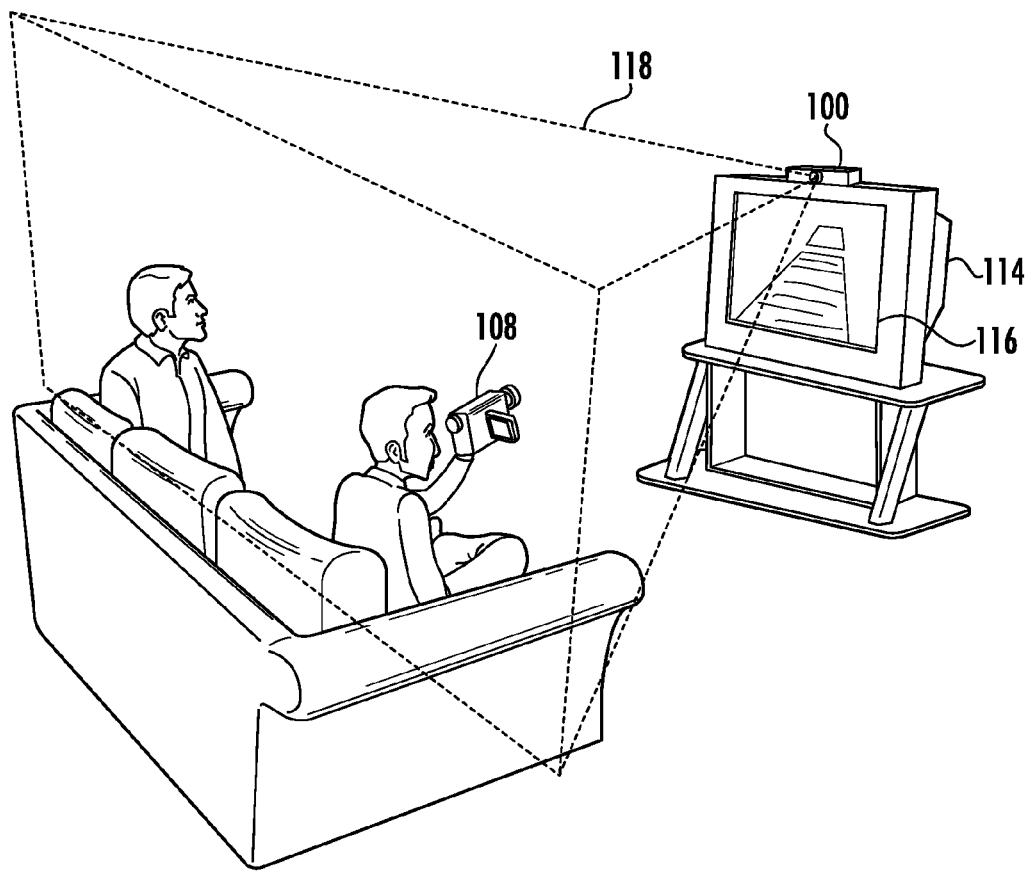
Figure 1D:
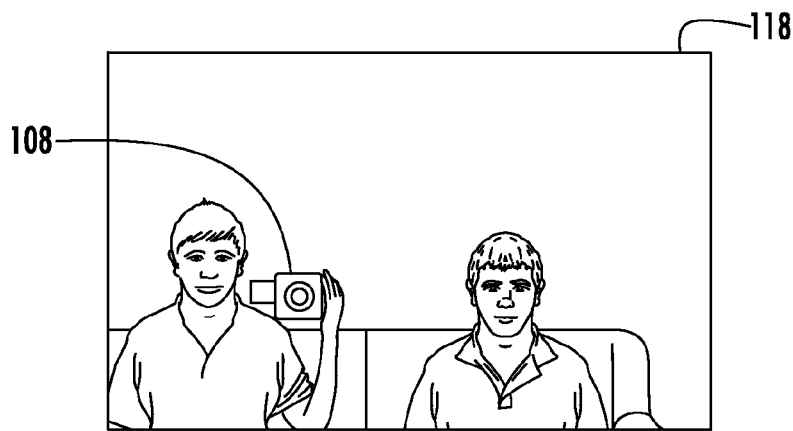

In one embodiment, system 100 may be positioned on or near a display device 114, such as a television or computer monitor (as shown in FIG. 1C). In other embodiments, system 100 may be positioned within, or integrated with a display device 114, such as a television, tablet computer (as shown in FIG. 1D), personal computer, laptop computer, and the like. In another embodiment, system 100 may be part of or positioned within a theatre, such as, but not limited to, a movie theatre (as shown in FIG. 1E), a home theatre, a hotel theatre, a mini theatre, and the like.

In some embodiments, system 100 may further comprise a means for receiving user input, which in some embodiments, may be any type of means, including, but not limited to: a telephone modem: a key pad, a key board, a remote control, a touch screen, a virtual keyboard, a mouse, a stylus, a microphone, a camera, and a biometric reader such as a fingerprint scanner, a retinal scanner, and the like. In a further embodiment, at least one means for receiving user input may be in electronic communication with at least one processor 102. At least one means for receiving user input may be used to authenticate or identify a user prior to playing content 116. Such authentication may comprise authentication a user by requesting that the user submit a user name and password combination, a biometric identifier, and the like. In some embodiments, the identity or account of the user may be flagged if a recording device is detected. In some embodiments, it may be the case that recording device 108 is being used to pirate content 116, in which case it may be desirous to identify the user through biometric identifiers, which may serve as evidence in a prosecution.

In yet a further embodiment, system 100 may further comprise of a means for implementing selectable output control (SOC) technology, so as to limit the transfer or display of content 116 to authorized devices. Such a means may include a set top box or similar device that employs a processor or board for processing SOC Digital Rights Management (DRM), and is capable of outputting an HDMI signal with HDCP encryption.

Throughout the present disclosure, it should be understood that computer executable instructions, such as those in system 100, may be used to manipulate and use the various embodiments of systems and components thereof, such as at least one sensor 104, at least one processor 102, at least one content playing device, at least one means for receiving user input, and the like.

Overview of Method Embodiments

Figure 2:
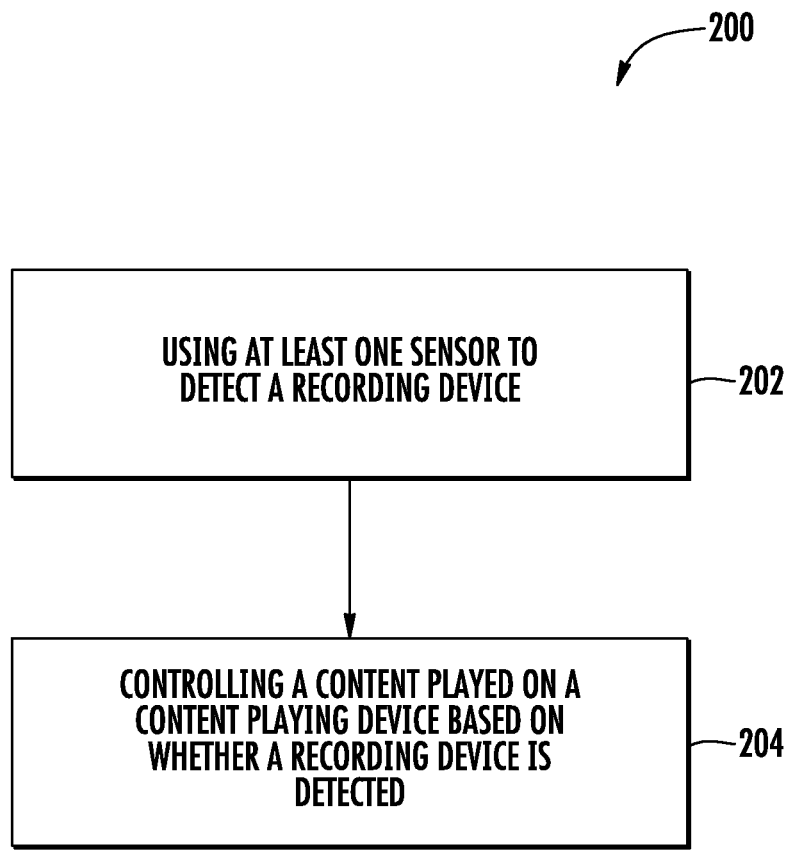
FIG. 2 shows a flow diagram depicting a method in accordance with one embodiment.

Referring now to FIG. 2, a diagram is shown representing an embodiment of method 200, wherein method 200 comprises using at least one sensor to detect a recording device (block 202), and controlling content played on a content playing device based on whether a recording device is detected (block 204). In a further embodiment, method 200 comprises using a processor to carry out any and/or all of the steps of method 200 described above and elsewhere throughout the present disclosure.

In some embodiments, the sensor may be any kind of sensor, including, but not limited to, a visual sensor, an audio sensor, a tactile sensor, a thermal sensor, a chemical sensor, an electrical sensor, a capacitive sensor, a resistive sensor, a camera, 3D camera or sensor, an infrared camera, a thermal imaging camera, a microphone, any other type of sensor described herein or above with reference to FIGS. 1A through 1D, and the like.

In some embodiments, the content may be audio content, such as music, dialogue, and the like, and/or visual content, such as images, text, movies, television shows, sports events, and the like. Alternatively, the content may be internet service. In some embodiments, the content may be tactile content, like vibrations or force feedback, while in other embodiments, the content may be perceived with the nose, such as smells, scents, and the like.

In a further embodiment of method 200, controlling the content based on whether a recording device is detected comprises any or all of the following: pausing the content when a recording device is detected, playing the content when a recording device is not detected, scrambling the content when a recording device is detected, or ceasing to play the content when a recording device is detected. In some embodiments, if at the outset of the content's play, a recording device is detected, the content may not even begin playing. In further embodiments, if at the outset of the content's play, a recording device is not detected, but at a later time is detected, the content playing may be scrambled, paused, frozen, or ceased altogether. In a further embodiment, if a recording device is detected at the outset of the content's play, but then later is not detected, the content may begin or continue playing. The content may be any kind of content, such as, but not limited to, a movie, a television show, a sports broadcast, such as a sports event, news, educational content, and the like.

In one embodiment, method 200 may include using object recognition software and/or firmware, which may be used to analyze data, such as an image or sound, captured by the at least one sensor to determine, and consequently detect, whether a recording device is present. The object recognition software may include any or all of the various embodiments of object recognition software described above with reference to FIGS. 1A through 1D and elsewhere throughout the present disclosure. Detecting a recording device may include using object recognition software to detect a recording device or a component thereof, such as by using object recognition software to detect an object having a spherical, flat, or circular surface, such as a lens. In another embodiment, detecting a recording device may include capturing data, such as an image of a recording device, captured by the at least one sensor, and comparing it to data, such as images of recording devices, stored in a database.

In a further embodiment, method 200 may include triggering an alert if a recording device is detected. In some embodiments, the alert may be a local alert, such as an audible or visual alert capable of being perceived by the persons in close proximity. In yet another embodiment, the alert may be a remote alert, such as an alert sent to a remote device, user, or station, wherein the alert may be any kind of alert, including, but not limited to, an e-mail, and SMS message, a phone call, and the like. In some embodiments, if a recording device is detected, an alert may be sent to a remote station notifying authorities that someone may be trying to pirate content.

In a further embodiment, method 200 may be carried out in whole or in part, in a theatre, such as, but not limited to, a movie theatre, a home theatre, an office theatre, a hotel theatre, a condominium theatre, an auditorium, a restaurant theatre, a personal computer theatre, and the like.

Throughout the present disclosure, it should be understood that computer executable instruction may be used to carry out the various steps of method 200.

In some embodiments, method 200 further comprises using at least one processor to carry out any of the aforementioned steps, or any other steps described in the present disclosure.

In some embodiments, method 200 may be implemented as a computer readable medium having computer executable instructions. The term "computer readable medium," as used throughout this disclosure, may refer to any computer readable medium, such as CD-ROMs, CD-Rs, CD-RWs, floppy disks, hard drives, flash drives, diskettes, solid state drives, tape drives, and any other form of computer readable medium.

In some embodiments method 200 may be integrated wholly, or in part, into system 100 described above, as well as other systems and methods described throughout the present disclosure. In some embodiments, method 200 may be carried out using the various systems described throughout the present disclosure.

Hardware and Operating Environment

This section provides an overview of example hardware and the operating environments in conjunction with which embodiments of the inventive subject matter may be implemented.

A software program may be launched from a computer readable medium in a computer-based system to execute function defined in the software program. Various programming languages may be employed to create software programs designed to implement and perform the methods disclosed herein. The programs may be structured in an object-orientated format using an object-oriented language such as Java or C++. Alternatively the programs may be structured in a procedure-oriented format using a procedural language, such as assembly or C. The software components may communicate using a number of mechanisms, such as application program interfaces, or inter-process communication techniques, including remote procedure calls. The teachings of various embodiments are not limited to any particular programming language or environment. Thus, other embodiments may be realized, as discussed regarding FIG. 3 below.

Figure 3:
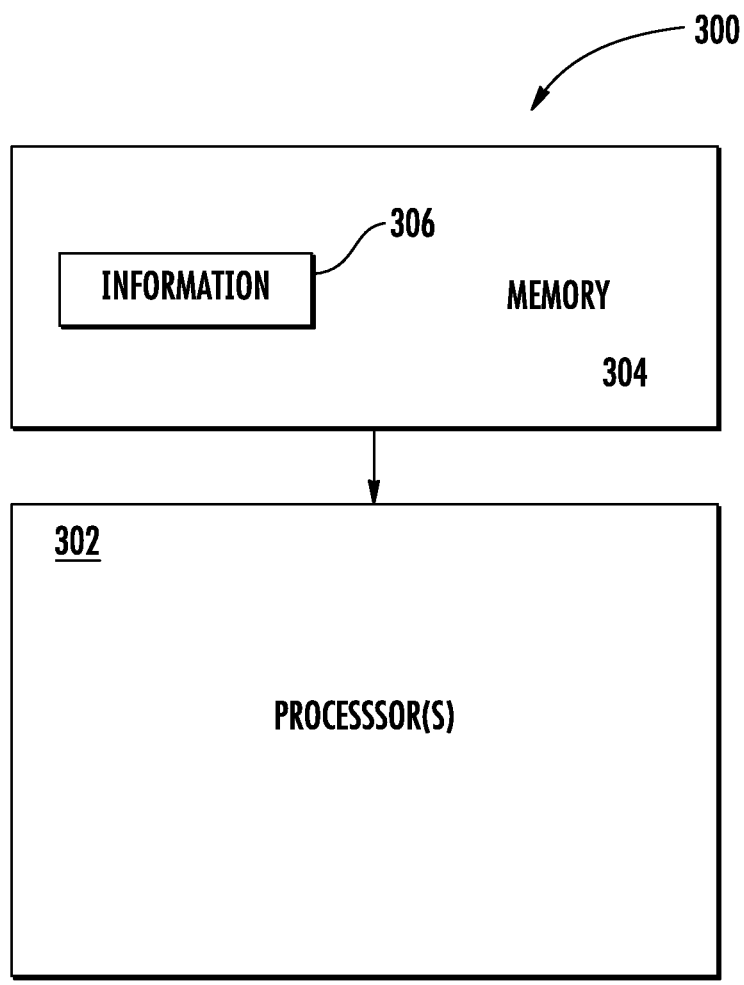
FIG. 3 shows an article in accordance with one embodiment.

FIG. 3 is a block diagram representing an article according to various embodiments. Such embodiments may comprise a computer, a memory system, a magnetic or optical disk, some other storage device, or any type of electronic device or system. The article 300 may include one or more processor(s) 302 coupled to a machine-accessible medium such as a memory 304 (e.g., a memory including electrical, optical, or electromagnetic elements). The medium may contain associated information 306 (e.g., computer program instructions, data, or both) which, when accessed, results in a machine (e.g., the processor(s) 302) performing the activities previously described herein.

The principles of the present disclosure may be applied to all types of computers, systems, and the like, include desktop computers, servers, notebook computers, personal digital assistants, and the like. However, the present disclosure may not be limited to the personal computer.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A system for reporting a party responsible for content pirating comprising:
    at least one processor;
    a content playing device;
    at least one 3D camera electronically connected to the at least one processor, where the 3D camera has a field of sensing that is greater than the content playing device's field of perception;
    at least one biometric reader electronically connected to the at least one processor; and
    computer executable instructions readable by the at least one processor and configured to:
        use the at least one biometric reader to collect at least one biometric identifier from at least one user of the content playing device to determine an identity of the at least one user;
        use the at least one 3D camera to detect a recording device, wherein detecting a recording device comprises capturing at least one 3D image of an object or feature of a recording device; and
        if a recording device is detected, then flag the identity of the at least one user using the at least one biometric identifier.

2. The system of claim 1, wherein the object or feature of a recording device comprises a lens.

3. The system of claim 1, wherein the computer executable instructions are configured to flag a user account associated with the at least one user if a recording device is detected.

4. The system of claim 1, wherein the computer executable instructions are configured to control content capable of being played on the content playing device, wherein controlling the content comprises controlling the content based on whether a recording device is detected.

5. The system of claim 4, wherein controlling the content comprises scrambling the content, ceasing to play the content, pausing the content, playing the content, or continuing to play the content.

6. The system of claim 1, wherein detecting a recording device comprises using the at least one 3D camera to capture data related to the recording device, and comparing the captured data to data stored in a database to confirm the presence or detection of the recording device.

7. The system of claim 1, wherein the computer executable instructions are configured to communicate with at least one remote media service provider, and transmit or receive information to or from the at least one remote media service.

8. The system of claim 7, wherein the computer executable instructions are configured to transmit an alert to the at least one remote media service provider if a recording device is detected.

9. The system of claim 7, wherein the information comprises media content.

10. The system of claim 1, wherein the computer executable instructions are further configured to trigger an alert if a recording device is detected.

11. The system of claim 1, wherein the system is associated with at least one at-home display device.

12. The system of claim 9, wherein the computer executable instructions are configured to use the at least one biometric identifier to authenticate the at least one user prior to playing the media content on the content playing device.

13. The system of claim 12, wherein the computer executable instructions are configured to use the at least one biometric reader to collect at least one biometric identifier from the at least one user for use in evidence in prosecuting the at least one user for content piracy.

14. The system of claim 1, wherein the at least one processor is part of a home theatre.

15. A method for reporting a party responsible for content pirating comprising:
    using at least one 3D camera having a field of sensing that is greater than a field of perception of a content playing device, to detect a recording device, wherein detecting a recording device comprises capturing at least one 3D image of an object or feature of a recording device;
    using at least one biometric reader to collect at least one biometric identifier from at least one user of the content playing device to determine an identity of the at least one user; and
    if a recording device is detected, then flagging the identity of the at least one user using the at least one biometric identifier.

16. The method of claim 15, wherein using at least one 3D camera to detect a recording device comprises using the at least one 3D camera to capture data related to the recording device, and comparing the captured data to data stored in a database to confirm the presence or detection of the recording device.

17. The method of claim 15, further comprising communicating with at least one remote media service provider, and transmitting or receiving information to or from the at least one remote media service provider.

18. The method of claim 15, further comprising: if a recording device is detected, then controlling content played on the content playing device, wherein controlling the content comprises scrambling the content, ceasing to play the content, or pausing the content.

19. The method of claim 15, further comprising using the at least one biometric identifier to authenticate or identify the at least one user as a prerequisite to playing content on the content playing device.

20. A non-transitory computer readable medium having computer executable instructions for performing a method for reporting a party responsible for content pirating comprising:
  using at least one 3D camera having a field of sensing that is greater than a field of perception of a content playing device, to detect a recording device, wherein detecting a recording device comprises capturing at least one 3D image of an object or feature of a recording device;
  using at least one biometric reader to collect at least one biometric identifier from at least one user of the content playing device to determine an identity of the at least one user; and
  if a recording device is detected, then flagging the identity of the at least one user using the at least one biometric identifier.

21. The non-transitory computer readable medium of claim 20, wherein the method further comprises using the at least one biometric identifier to authenticate or identify the at least one user as a prerequisite to playing content on the content playing device.

22. The non-transitory computer readable medium of claim 20, wherein the method further comprises: if a recording device is detected, then controlling content played on the content playing device, wherein controlling the content comprises scrambling the content, ceasing to play the content, or pausing the content.

\* \* \* \* \*